No. 722,381. PATENTED MAR. 10, 1903.
G. W. PEYTON.
CARPENTER'S GAGE.
APPLICATION FILED MAY 28, 1901.
NO MODEL.

Witnesses:

Inventor:
George W. Peyton
By John F. Mullaney
Atty.

THE NORRIS PETERS CO., PHOTO-LITHO., WASHINGTON, D. C.

UNITED STATES PATENT OFFICE.

GEORGE W. PEYTON, OF COLORADO SPRINGS, COLORADO.

CARPENTER'S GAGE.

SPECIFICATION forming part of Letters Patent No. 722,381, dated March 10, 1903.

Application filed May 28, 1901. Serial No. 62,288. (No model.)

*To all whom it may concern:*

Be it known that I, GEORGE W. PEYTON, a citizen of the United States, residing at Colorado Springs, in the county of El Paso and State of Colorado, have invented a new and useful Carpenter's Gage, of which the following is a specification.

My invention relates to improvements in carpenter's gages in which toothed wheels are made to revolve on adjustable axles and mark the wood over which they roll; and the objects of my improvements are, first, to provide toothed marking-wheels that will climb out of a groove in the wood or over the crooked grain of the wood and be provided each with a long sleeve-like hub to insure its running truly; second, to afford facilities for the proper adjustment of the gage-wheel markers, so that they may be held rigidly at the desired distances from each other and from the gage-base or shoulder-slide, and, third, to provide means for extension of the length of the gage-rods when desired and for telescoping them and reducing the instrument to a compact body when not in use. I attain these objects by the mechanism illustrated in the accompanying drawings, in which—

Figure 1:
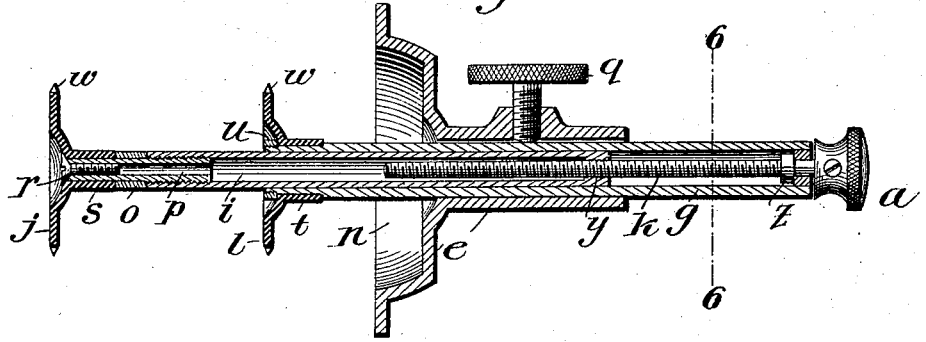
Figure 2:
Figure 3:
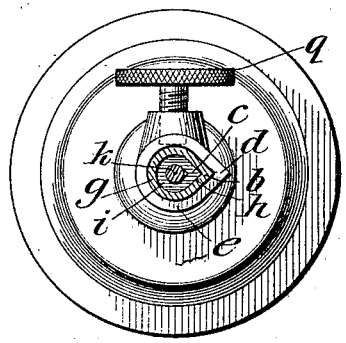
Figure 4:
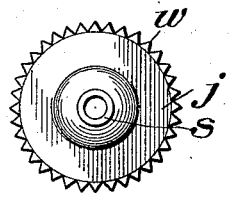

Figure 1 is a vertical section of the entire machine as dissected through the entire center. Fig. 2 is a longitudinal section of an extension-rod. Fig. 3 is an end view of the right end of Fig. 1 dissected off at 6 6, showing flanges $b$ and $c$; and Fig. 4 is a view of one of the marking-wheels, showing marking-teeth $w$.

Similar letters refer to similar parts throughout the several views.

The gage-base or shoulder-slide $e$ constitutes the base or framework of the entire instrument.

In the base $e$ is a groove $d$, into which fits a flange $b$ on the tube $g$, and on the inside of tube $g$ is a groove $h$, made by the pressing out of tube $g$ to form flange $b$, and into which groove $h$ flange $c$ on rod $i$ is made to slide. These grooves and their respective flanges are provided so that the tube-rods $g$ and $i$ may not rotate on screw $k$, and thus change the distance between marking-wheels $j$ and $l$.

The base $e$ is provided with a circular cup-shaped recess $n$, into which marking-wheels $j$ and $l$ may recede when not in use, and thus be less liable to injure or to be injured.

If it is desired to gage wide pieces of lumber, the extension-tube $m$ may be inserted between $o$ and $i$, which are fastened together by a screw-plug $p$, which is rigidly attached to $o$ and screws into $i$. This makes an arm as long as $o$ $m$ $i$, while the marking-wheel $l$ remains within $n$, and if it is desired to make two gage-marks at the same stroke, as in gaging for a mortise, the thumb-screw $q$ may be loosened and the tube $g$ be thus pushed out, so that the marking-wheel $l$ will be to the distance for the mark nearest the edge of the timber, and then by setting thumb-screw $q$ on tube $g$ it will be retained there until released by screw $q$, while marking-wheel $j$ may be forced away from or near to marking-wheel $l$ by means of screw $k$ by turning thumb-screw head $a$, thus adjusting marking-wheel $j$ to marking-wheel $l$ or to base-frame $e$. The outer face of marking-wheel $j$ is flush with screw $r$, the head of which is hid in the countersunk recess in the hub of said marking-wheel $j$ to permit of marking in close proximity to jambs or corners in carpentry.

In Fig. 1, $z$ is a collar rigidly attached to screw $k$ to prevent its moving longitudinally in tube $g$, and $y$ is a nut rigidly attached to the inside of the end of tube $i$ to engage the threads on screw $k$, while $t$ and $s$ represent, respectively, the sleeve-like hubs on marking-wheels $l$ and $j$, providing them with broad bearings to prevent them wabbling on their respective axles.

I am aware that prior to my invention carpenters' gages with sliding arm and with adjustable markers have been used and that toothed marking-wheels have been used for various purposes. I therefore do not claim such a combination broadly; but What I do claim as my invention, and desire to secure by Letters Patent, is—

1. In a carpenter's marking-gage the base $e$, provided with recess $n$, to receive rotating marking-wheels $l$ and $j$, and with thumb-screw $q$, so arranged and threaded as to clamp rigidly tube $g$; all in combination with tubes $g$ and $i$, provided with marking-wheels $l$ and $j$, respectively, and as described, and substantially for the purposes set forth.

2. In a carpenter's or woodworker's marking-gage, tubular rod $i$, provided with extension-tube joint $m$, having screw-plug $v$; and rod $o$, provided with screw-plug $p$; and adjusting-screw $k$; all in combination with tube $g$, and base $e$, substantially as described and for the purposes set forth.

3. In a carpenter's marking-gage, the tube $g$ provided with base $e$, marking-wheel $l$, tube-rod $i$, carrying marking-wheel $j$ and screw-rod $k$, and being provided with nuts $u$ and $z$, all for the purposes described and for the purposes set forth.

In testimony whereof I have signed my name to this specification in the presence of two subscribing witnesses.

GEORGE W. PEYTON.

Witnesses:
JOHN F. MULLANEY,
H. K. WING.